Figure 1:
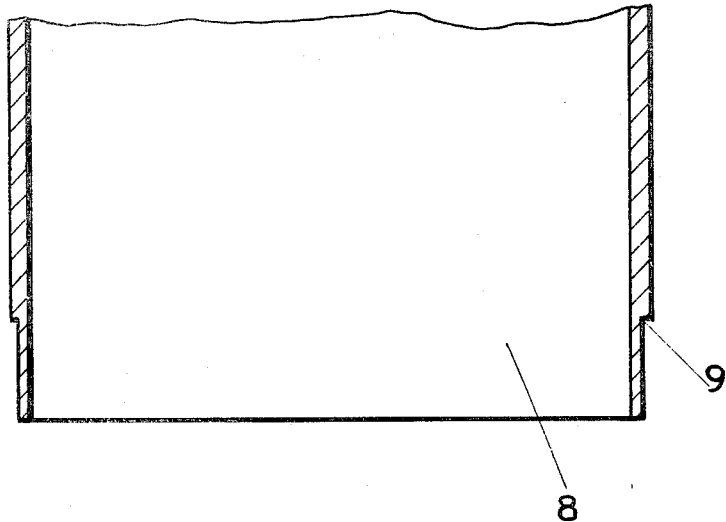
Figure 1:
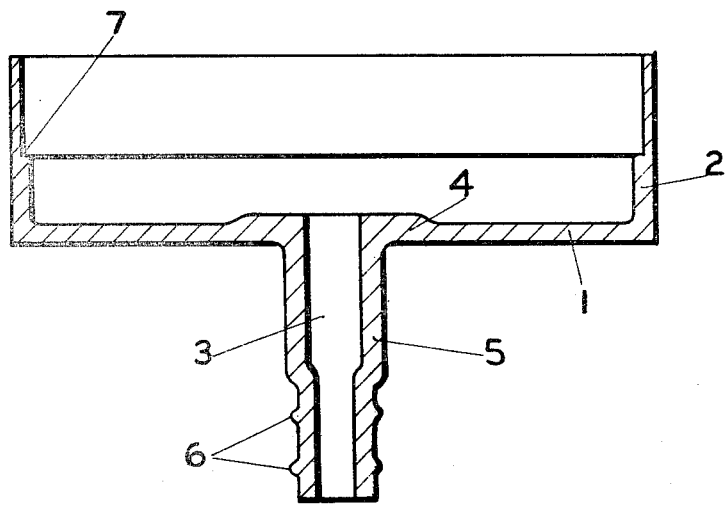

Aug. 24, 1965  S. GORDON ETAL  3,202,730
PROCESS FOR MAKING PROPELLANT CHARGES
Filed March 5, 1962  2 Sheets-Sheet 1

INVENTORS
STUART GORDON
KENNETH GORDON REED
JOHN CHRISTOPHER NIGEL RUSSELL
BY Cushman, Darby & Cushman
ATTORNEYS 3,202,730
PROCESS FOR MAKING PROPELLANT CHARGES
Stuart Gordon and Kenneth Gordon Reed, Kidderminster, and John Christopher Nigel Russell, Stourport-on-Severn, England, assignors to Imperial Chemical Industries Limited, Millbank, London, England, a corporation of Great Britain
Filed Mar. 5, 1962, Ser. No. 177,272
Claims priority, application Great Britain, Mar. 7, 1961, 8,336/61
4 Claims. (Cl. 264—3)

This invention relates to solid propellant charges for use in rocket motors, engine starters and the like.

It is often desirable that charges of this type should be produced in cylindrical form and be arranged to burn cigarette-wise at a reasonably steady rate, and to ensure this steady burning, special precautions have to be taken to prevent ignition of the propellant at surfaces other than the end face from which it is intended to burn. One method of ensuring this is to coat the surface of the propellant, with the exception of one end face, with a combustion-inhibiting material.

Hitherto, this has been achieved by coating long cylindrical lengths of propellant with combustion-inhibiting material, cutting these into charges of suitable length and then bonding a disc of the inhibitor to one end face of each charge. However, when charges inhibited in this way are subjected to temperature cycling tests, separation or cracking of the inhibiting material often occurs in the region adjacent to the junction between the end disc and the cylindrical surface. This is particularly undesirable as it is likely to cause the charges to malfunction, especially after prolonged storage.

One object of the present invention is to provide an alternative means of end inhibition of solid propellant charges which does not suffer from the above-mentioned defect.

In accordance with the said invention a gas-producing charge for use in rocket motors, engine-starters and the like comprises a mass of propellant adapted to be ignited at one end and to burn progressively to the other end, the said mass being enclosed in and bonded to a sheath of combustion-inhibiting material except for that end of the mass at which the charge is to be ignited, characterised in that the said sheath consists at least in part of a base having integral walling upstanding around its periphery and in that the propellant is a double-base propellant cast within the sheath.

Preferably the entire sheath consists of a single jointless structure adapted to cover all but the ignition end of the combustible mass.

Where the sheath cannot be made satisfactorily as a single jointless structure, the walling around the periphery of the base may be extended in the direction away from the base by additional walling bonded to the base walling.

According to the present invention the method for the production of a gas-producing charge for use in rocket motors, engine-starters and the like comprising a mass of propellant adapted to be ignited at one end and to burn progressively to the other end, the said mass being enclosed in and bonded to a sheath of combustion-inhibiting material except for that end of the mass at which the charge is to be ignited comprises casting a double-base propellant mixture comprising a propellant in a sub-divided form and a casting liquid containing liquid nitric ester within a sheath consisting at least in part of a base having integral walling upstanding around its periphery.

Preferably the propellant in sub-divided form is a granular double-base or single-base propellant and the casting liquid is a desensitized nitro-glycerine.

The base and at least the lower wall of the sheath may be formed integrally in the shape of a cup by means of compression or injection moulding. When it is necessary to extend the wall of the cup, an extruded or convolute wound tube of the same diameter as the wall of the cup is bonded to it. In the hollow space defined by the sheath of inhibiting material there may then be introduced propellant in sub-divided form and casting liquid, and the resulting mass then cured to produce a hard solid mass.

Casting may be effected by any very convenient method, but preferably the hollow sheet is first packed with granular propellant and the air remaining between the granules is displaces by casting liquid. Curing by exposing to suitable elevated temperatures causes swelling of the propellant granules by the casting liquid and coalescence of the whole to a hard mass bonded to the combustion-inhibiting sheath.

In order to facilitate displacement of entrapped air by the casting liquid, an orifice may be provided in the base-cup of the sheath. Casting liquid may then enter at one end of the sheath while air is displaced at the other. Top or bottom casting liquid addition techniques may be used, but the use of bottom addition has the advantage that the final product is less likely to contain entrapped air. When using bottom addition, the casting liquid is caused to flow into the sheath through the orifice in the base-cup and forced upwards between the propellant granules. This may be done by applying either gas pressure at the bottom or vacuum at the top of the sheath or both together. Whichever method is used, it is advisable to keep the cast propellant under an atmosphere of inert gas at a slight positive pressure during the final curing process. This ensures that no gas bubbles are formed in the mass of propellant during curing.

The bond between the combustion-inhibiting material and the propellant is formed during the curing step when the propellant mass solidifies.

When the propellant charges has been cured, the orifice in the base-cup of the sheath may be sealed by bonding a disc of combustion-inhibiting material over it.

It has been found that charges prepared in this way show no signs of separation or cracking of the inhibitor after prolonged temperature cycling.

The preferred embodiment of the invention is illustrated in FIGURE 1 of the accompanying diagrammatic drawing which shows an exploded sectional view of a base-cup, extension tube and sealing disc of ignition-inhibiting material.

Figure 2:
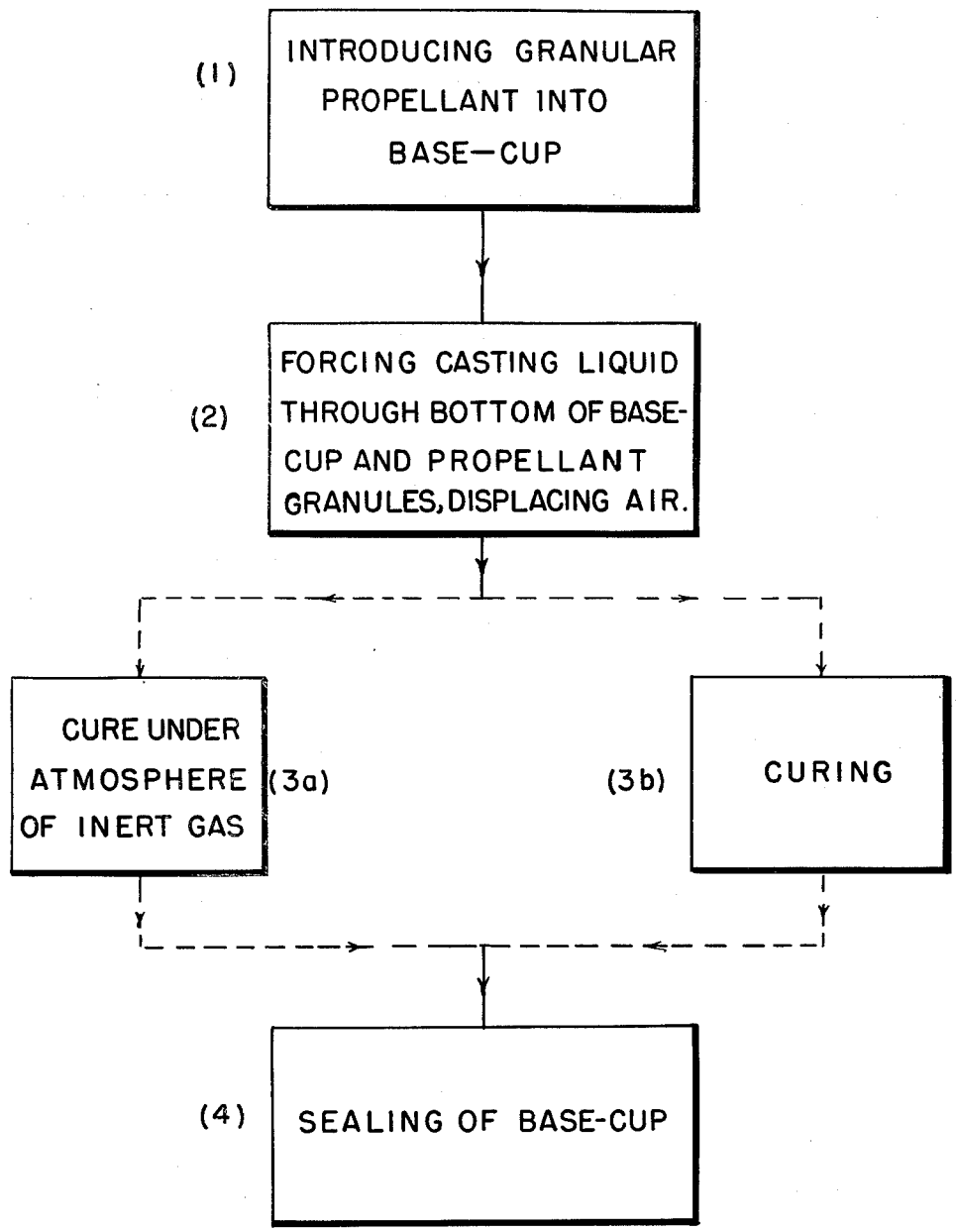

FIGURE 2 is a self-explanatory flow diagram illustrating the inventive process.

The base-cup consists of a disc 1, having an integral cylindrical wall 2 about its periphery and a central orifice 3, opening through a spigot 5 located at right-angles to the disc 1 but on the opposite side to the wall 2. The rim of the orifice 3 at the disc 1 is reinforced by a thickening 4 and the lower end of the spigot 5 is reduced in diameter and provided with ribs 6 to provide a surface on which a flexible tube (not shown) may grip. A shoulder 7 is provided on the upper rim of wall 2.

The cup may be moulded in cellulose acetate, using any standard compression or injection moulding technique.

The extension tube 8 is also made of cellulose acetate and may be formed by extrusion or by winding cellulose acetate strip on to a mandrel, bonding successive layers of strip together and removing the resulting tube from the mandrel.

One end of the tube 8 is provided with a shoulder 9 arranged so that it is a push fit in the base-cup. In practice, because of the dimensional changes which plastic materials are likely to undergo on storage, it is convenient to make these joints oversize and machine them to size immediately before assembling the base-cup and tube.

As shown in FIGURE 2, when the base-cup and tube have been assembled, the sheath formed is filled (1) with a granular propellant and the air spaces between the granules filled (2) with a suitable casting liquid, e.g. desensitised nitro-glycerine. This is accomplished by connecting a reservoir of casting liquid to spigot 5 by means of a flexible tube and forcing the casting liquid upwards into the sheath by pressurizing the reservoir with nitrogen. Alternatively, the top of the sheath may be restricted in some way and vacuum applied to the restricted opening, thus drawing the casting liquid into the sheath.

The whole mass is solidified and cured (3b) under the positive pressure conditions appropriate to the type of double-base propellant used, for example, the upper surface of the propellant (3a) may be maintained under a slight positive pressure of nitrogen during curing, e.g. 3–35 lbs./sq. in.

When curing is complete, the spigot 5 is cut from the base-cup of the sheath and the outside of the disc 1 machined flat. The remaining hole is then sealed by bonding a disc 10 of cellulose acetate over it, using a cement consisting of cellulose acetate dissolved in a suitable solvent.

The following record is for comparative temperature cycling experiments carried out on cigarette-burning propellant grains of 7″ diameter made by a previously recognized standard technique and not according to the invention by coating long cylindrical lengths of double-base propellant with ignition-inhibiting material, cutting these into charges of desired length and then bonding a disc of an inhibitor to one end face of each charge and on gas-producing charges of 7″ diameter, of the same length, of the same double-base propellant composition and having the same inhibitor when made according to the invention.

When stored under the most favourable conditions, i.e. in a sealed rocket motor, the 7″ diameter grains pepared not according to the invention showed after temperature cycling to the following programme physical deterioration including separation between propellant and inhibitor at the inhibited end. The temperature cycle used consisted of 24 cycles, each cycle being 40 hours at 125° F., followed by 8 hours at 70° F., followed by 40 hours at −5° F., followed by 8 hours at 70° F. From this result it is deduced that −5/125° F. represents the extreme temperature range to which the charge may be submitted whilst enclosed in a motor body.

Charges made according to the method of the invention have successfully withstood 25 temperature cycles between −15° F. and 125° F., 24 hours at each temperature without ambient rest; 25 cycles −30/125° F. also at 24 hours at each temperature without ambient rest; and the following series of cycles of increasing severity:

5 cycles −15/125° F.
5 cycles −30/125° F.
5 cycles −15/140° F.
5 cycles −30/140° F.
5 cycles −40/140° F.

In none of these series was an ambient rest employed and the charges were cycled both for closed containers and completely exposed. No failure was detected. When cycled 25 times −40/140° F. without ambient rest in the exposed condition small separations were observed between the propellent and the inhibition. These figures demonstrate conclusively the ability of charges made according to the invention to withstand much more severe temperature cycling than similar charges end inhibited by the aforementioned method not in accordance with the method of the invention.

We claim:

1. A method for the production of a gas-producing double-base propellant charge for use in rocket motors, engine-starters and the like using a cylindrical sheath of combustion inhibiting material consisting at least in part of a base-cup having upstanding walls around its periphery defining a hollow space therein, said sheath being open at one end thereof for igniting said charge and said sheath having an orifice in the other base-cup end thereof, comprising the steps of introducing into the sheath a granular mass comprising one component part of the said propellant, introducing a casting liquid comprising the other component part of said propellant through said orifice beneath the propellant granules and forcing the casting liquid to rise between the propellant granules, thereby displacing the air remaining between the propellant granules as the casting liquid rises, said casting liquid containing a liquid nitric ester, followed by curing the entire mass under positive pressure such that the propellant mass is enclosed in and bonded to the combustion inhibiting material of the base-cup and upstanding walls of the sheath to produce a hard and solid charge adapted to be ignited at said one igniting end and to burn progressively to the other base-cup thereof.

2. A method as claimed in claim 1 wherein the cast propellant is kept under an atmosphere of inert gas at a slight positive pressure during the step of final curing.

3. A method as claimed in claim 1 wherein the orifice in the base-cup of the sheath is sealed by bonding a disc of ignition-inhibiting material over it.

4. A method as claimed in claim 1 wherein said base-cup comprises a substantially flat member having integral side walls extending upwardly therefrom, the upper portion of said side walls forming an annular flange adapted to receive an extension tube and thereby forming a joint well within the cylindrical length of the ultimate finished charge and well away from the angle between the inhibited base-cup and the upstanding cylindrical length of the charge.

References Cited by the Examiner

UNITED STATES PATENTS

| | | | |
|---|---|---|---|
| 3,000,317 | 9/61 | Kirchner | 102—98 |
| 3,010,354 | 11/61 | Adelman | 86—1 |
| 3,010,355 | 11/61 | Cutforth | 86—1 |
| 3,028,810 | 4/62 | Proell | 102—98 |
| 3,033,715 | 5/62 | Preckel | 149—96 |
| 3,056,171 | 10/62 | Fite | 86—1 X |
| 3,092,525 | 6/63 | Cook | 86—1 |

OTHER REFERENCES

"Rocket Propellants," by Francis A. Warren, Reinhold Publishing Co., 1958. (pages 58–61 required).

BENJAMIN A. BORCHELT, *Primary Examiner.*

SAMUEL BOYD, SAMUEL FEINBERG, *Examiners.*